(12) United States Patent
Kim et al.

(10) Patent No.: US 11,109,406 B2
(45) Date of Patent: *Aug. 31, 2021

(54) SCHEDULING METHOD AND DEVICE IN WIRELESS COMMUNICATION SYSTEM PROVIDING BROADBAND SERVICE

(71) Applicant: Samsung Electronics Co., Ltd., Gyeonggi-do (KR)

(72) Inventors: Youngbum Kim, Seoul (KR); Yongjun Kwak, Gyeonggi-do (KR); Jeongho Yeo, Gyeonggi-do (KR); Juho Lee, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

This patent is subject to a terminal disclaimer.

(21) Appl. No.: 16/861,628

(22) Filed: Apr. 29, 2020

(65) Prior Publication Data

US 2020/0260477 A1   Aug. 13, 2020

Related U.S. Application Data

(63) Continuation of application No. 15/577,062, filed as application No. PCT/KR2016/005128 on May 13, 2016, now Pat. No. 10,645,722.

(30) Foreign Application Priority Data

May 29, 2015   (KR) .......................... 10-2015-0076555

(51) Int. Cl.
*H04W 72/12* (2009.01)
*H04W 72/04* (2009.01)
(Continued)

(52) U.S. Cl.
CPC ....... *H04W 72/1289* (2013.01); *H04L 1/1812* (2013.01); *H04L 5/001* (2013.01);
(Continued)

(58) Field of Classification Search
CPC ..... H04L 1/1812; H04L 5/001; H04L 5/0048; H04L 5/0055; H04L 5/0057; H04W 28/20;
(Continued)

(56) References Cited

U.S. PATENT DOCUMENTS

2011/0149894 A1 * 6/2011 Luo ...................... H04W 16/02
                                                                   370/329
2011/0243090 A1   10/2011 Grovlen et al.
(Continued)

FOREIGN PATENT DOCUMENTS

KR   1020140096433     8/2014
WO   WO 2011/084026    7/2011
(Continued)

OTHER PUBLICATIONS

PCT/ISA/210 Search Report issued on PCT/KR2016/005128 (pp. 3).
PCT/ISA/237 Written Opinion issued on PCT/KR2016/005128 (pp. 6).

*Primary Examiner* — Kan Yuen
(74) *Attorney, Agent, or Firm* — The Farrell Law Firm, P.C.

(57) ABSTRACT

The present disclosure relates to a communication technique in which a 5G communication system for supporting more high data transmission rate after a 4G system converges with
(Continued)

an IoT technology, and a system thereof. The present disclosure may be applied to intelligent services (e.g., smart hole, smart building, smart city, smart car or connected car, healthcare, digital education, retail business, security and safety-related services) based on a 5G communication technology and an IoT-related technology.

16 Claims, 15 Drawing Sheets

(51) Int. Cl.
*H04L 5/00* (2006.01)
*H04L 1/18* (2006.01)
*H04W 28/20* (2009.01)

(52) U.S. Cl.
CPC .......... *H04W 72/04* (2013.01); *H04L 5/0048* (2013.01); *H04L 5/0055* (2013.01); *H04L 5/0057* (2013.01); *H04W 28/20* (2013.01); *H04W 72/042* (2013.01); *H04W 72/0453* (2013.01)

(58) Field of Classification Search
CPC ............... H04W 72/04; H04W 72/042; H04W 72/0453; H04W 72/1215; H04W 72/1278; H04W 72/1289
See application file for complete search history.

(56) References Cited

U.S. PATENT DOCUMENTS

| | | |
|---|---|---|
| 2012/0176884 A1 | 7/2012 | Zhang |
| 2013/0010691 A1* | 1/2013 | Jung ..................... H04L 5/0092 370/328 |
| 2013/0010714 A1 | 1/2013 | Kim et al. |
| 2013/0336173 A1 | 12/2013 | Mandil |
| 2014/0126403 A1* | 5/2014 | Siomina ................ H04J 11/005 370/252 |
| 2014/0133433 A1 | 5/2014 | Ahn et al. |
| 2014/0211671 A1 | 7/2014 | Choi et al. |
| 2017/0078939 A1* | 3/2017 | Takahashi ............. H04W 48/20 |

FOREIGN PATENT DOCUMENTS

| | | |
|---|---|---|
| WO | WO 2013/012213 | 1/2013 |
| WO | WO 2013/026414 | 2/2013 |

* cited by examiner

SCHEDULING METHOD AND DEVICE IN WIRELESS COMMUNICATION SYSTEM PROVIDING BROADBAND SERVICE

PRIORITY

This application in a Continuation of U.S. application Ser. No. 15/577,062, which was filed in the U.S. Patent and Trademark Office on Nov. 27, 2017, and claims priority to International Application No. PCT/KR2016/005128 which was filed on May 13, 2016, and claims priority to Korean Patent Application No. 10-2015-0076555, which was filed on May 29, 2015, the content of each of which is incorporated herein by reference.

BACKGROUND

1. Field of the Disclosure

The present disclosure relates to a wireless communication system, and more particularly, to a scheduling method for a terminal in a wireless communication system providing a broadband service.

2. Description of the Related Art

To meet a demand for radio data traffic that is on an increasing trend since commercialization of a 4G communication system, efforts to develop an improved 5G communication system or a pre-5G communication system have been conducted. For this reason, the 5G communication system or the pre-5G communication system is called a beyond 4G network communication system or a post LTE system. To achieve a high data transmission rate, the 5G communication system is considered to be implemented in a super high frequency (mmWave) band (e.g., like 60 GHz band). To relieve a path loss of a radio wave and increase a transfer distance of the radio wave in the super high frequency band, in the 5G communication system, beamforming, massive MIMO, full dimensional MIMO (FD-MIMO), array antenna, analog beam-forming, and large scale antenna technologies have been discussed. Further, to improve a network of the system, in the 5G communication system, technologies such as evolved small cell, advanced small cell, cloud radio access network (cloud RAN), ultra-dense network, device to device communication (D2D), wireless backhaul, moving network, cooperative communication, coordinated multi-points (CoMP), and received interference cancellation have been developed. In addition, in the 5G system, hybrid FSK and QAM modulation (FQAM) and sliding window superposition coding (SWSC) that are an advanced coding modulation (ACM) scheme and a filter bank multi carrier (FBMC), a non-orthogonal multiple access (NOMA), and a sparse code multiple access (SCMA) that are an advanced access technology, and so on have been developed.

Meanwhile, the Internet is evolving from a human-centric communication network in which information is generated and consumed by humans to the Internet of Things (IoT) network in which distributed components such as things exchange and process information. Internet of Everything (IoE) technology in which big data processing technology through connection with a cloud server, or the like is combined with the IoT technology also is emerging. In order to implement the IoT, technology elements such as the sensing technology, wired/wireless communication and network infrastructure, service interface technology, and security technology are required, thus, recent, research into the sensor network, Machine to Machine (M2M), and Machine Type Communication (MTC) technologies for connection between things has been conducted. In the IoT environment, it is possible to provide an intelligent Internet technology (IT) that is capable of collecting and analyzing data generated from connected things to create new values for human life. The IoT may be applied to various fields such as smart home, smart building, smart city, smart car or connected car, smart grid, health care, smart appliance, and advanced medical service through existing information technology (IT) and fusion and convergence between various industries.

Thus there are various attempts to apply the 5G communication system to the IoT network. For example, the sensor network, Machine to Machine (M2M), and Machine Type Communication (MTC) technologies are implemented by means of 5G communication technologies such as beamforming, MIMO, and array antenna. The application of the above-described cloud RAN as a big data processing technology is an example of convergence between the 5G technology and the IoT technology.

A wireless communication system has been developed as a broadband wireless communication system providing a high-speed and high-quality packet data service like communication standards such as, for example, high speed packet access (HSPA) of $3^{rd}$ generation partnership project (3GPP), long term evolution (LTE) or evolved universal terrestrial radio access (E-UTRA), LTE-Advanced or E-UTRA Evolution (LTE-A), high rate packet data (HRPD) of 3GPP2, ultra-mobile broadband (UMB), and 802.16e of institute of electrical and electronics engineers (IEEE). The LTE-A which is an advanced system of the LTE includes additional functions such as a carrier aggregation (CA) technology, a higher order multiple input multiple output (higher order MIMO) technology, and the like, in addition to the existing LTE function. In describing the present disclosure, unless indicated otherwise, the LTE-A and the LTE are mixedly used.

The LTE and LTE-A system, as a representative example of the broadband wireless communication system, uses an orthogonal frequency division multiplexing (OFDM) scheme in a downlink (DL), and a single carrier frequency division multiple access scheme in an uplink (UL). The uplink means a wireless link through which a terminal (user equipment (UE) or mobile state (MS)) transmits data or a control signal to a base station (BS) (or eNodeB), and the downlink means a wireless link through which a base station transmits data or a control signal to a terminal. The multiple access scheme as described above is generally allocated and operated so that time-frequency resources for carrying data or control information for each user do not overlap with each other, that is orthogonality is implemented, thereby classifying data or control information of each user.

The present disclosure has been made in order to solve the above problems, and an aspect of the present disclosure provides a method for efficient broadband transmission and reception in which signaling overhead is not large.

SUMMARY

In accordance with an aspect of the present disclosure, a method for communication of a terminal in a wireless communication system, the method includes: receiving control information corresponding to a broadband transmission mode through a first bandwidth, and receiving downlink data having, as a maximum bandwidth, a bandwidth expanded as much as a second bandwidth from the first bandwidth, based on the control information.

In accordance with another aspect of the present disclosure, a method for communication of a base station in a wireless communication system, the method includes: transmitting control information corresponding to a broadband transmission mode to a terminal through a first bandwidth; and transmitting downlink data having, as a maximum bandwidth, a bandwidth expanded as much as a second bandwidth from the first bandwidth, to the terminal, based on the control information.

In accordance with another aspect of the present disclosure, a terminal in a wireless communication system, the terminal includes: a transceiver configured to transmit and receive a signal; and a controller configured to perform a control to receive control information corresponding to a broadband transmission mode through a first bandwidth and receive downlink data having, as a maximum bandwidth, a bandwidth expanded as much as a second bandwidth from the first bandwidth, based on the control information.

In accordance with another aspect of the present disclosure, a base station in a wireless communication system, the base station includes: a transceiver configured to transmit and receive a signal; and a controller configured to perform a control to transmit control information corresponding to a broadband transmission mode through a first bandwidth, and transmit downlink data having, as a maximum bandwidth, a bandwidth expanded as much as a second bandwidth from the first bandwidth, to the terminal, based on the control information.

According to an embodiment of the present disclosure, the mobile communication system supporting broadband transmission and reception is defined, and the method for data scheduling of the base station in the broadband transmission mode is provided, such that it is possible to support efficient use of radio resources.

BRIEF DESCRIPTION OF THE DRAWINGS

The above and/or other aspects, features, and advantages of the present disclosure will be more apparent from the following description, taken in conjunction with the accompanying drawings, in which.

DETAILED DESCRIPTION OF EMBODIMENTS OF THE PRESENT DISCLOSURE

Figure 1:
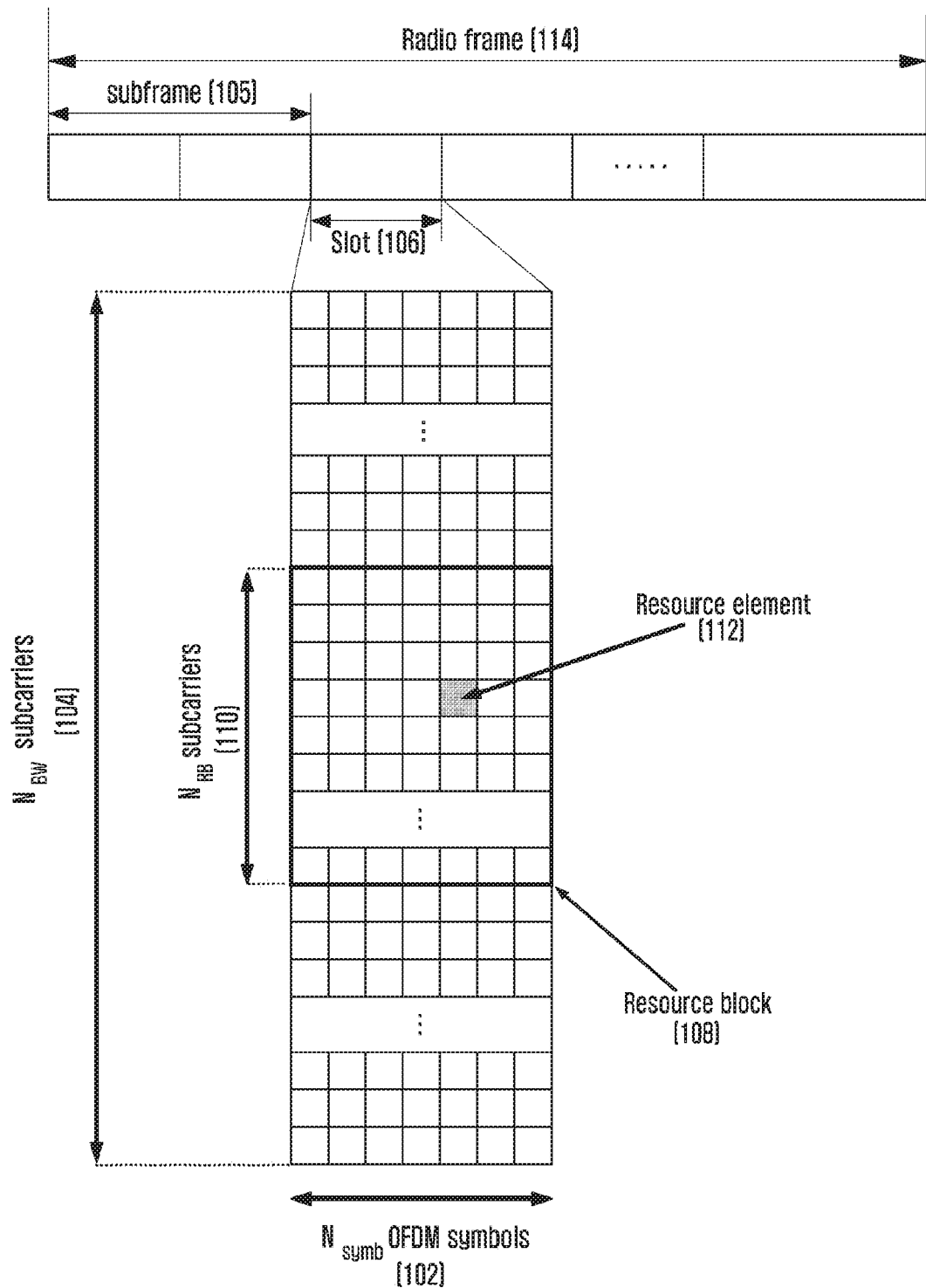
FIG. 1 is a diagram illustrating a structure of SC-FDMA/OFDMA-based time-frequency resources and subframes in an LTE and LTE-A system.

Hereinafter, embodiments of the present disclosure will be described in detail with reference to the accompanying drawings. In explaining the present disclosure, when it is determined that the detailed description for the known feature or components may unnecessarily obscure the gist of the present disclosure, the detailed description therefor will be omitted. Further, the following terminologies are defined in consideration of the functions in the present disclosure and may be construed in different ways by users, an intention of operators, or conventions. Therefore, the definitions thereof should be construed based on the contents throughout the specification.

Hereinafter, a base station may be at least one of an eNode B, a Node B, a BS, a radio access unit, a base station controller, and a node on a network, as a subject performing resource allocation of a terminal. A terminal may include user equipment (UE), a mobile station (MS), a cellular phone, a smartphone, a computer, or a multimedia system capable of performing a communication function. In the present disclosure, a downlink (DL) means a wireless transmission path of a signal transmitted by the base station to the terminal, and an uplink (UL) means a wireless transmission path of a signal transmitted by the terminal to the base station. Further, hereinafter, embodiments of the present disclosure will be described with the LTE or LTE-A system by way of example, but the embodiments of the present disclosure may also be applied to other communication systems having similar technical background or channel type. Further, the embodiments of the present disclosure may also be applied to other communication systems through some modification without departing from the scope of the present disclosure based on determination by a person skilled in the art.

The LTE and LTE-A system may use technologies such as an adaptive modulation and coding (hereinafter, referred to as AMC) method and a channel sensitive scheduling method in order to improve transmission efficiency. By using the AMC method, a transmitter may adjust an amount of transmitted data according to a channel state. That is, if the channel state is not good, the transmitter may reduce the amount of transmitted data to thereby satisfy a target reception error probability. If the channel state is good, the transmitter may increase the amount of transmitted data to thereby efficiently transmit a large amount of information while satisfying a target reception error probability. In a case of using the channel sensitive scheduling resource management method, the transmitter selectively provides a service to a user with excellent channel state among multiple users, thus a wireless system capacity of a mobile communication system is increased, as compared to a case in which the transmitter allocates a channel to one user and provides a service. The increase in capacity as described above is so-called a multi-user diversity gain. In short, the AMC method and the channel sensitive scheduling method are methods in which partial channel state information is fed back from a receiver and an appropriate modulation and coding scheme is applied at a point in time that is considered as most efficient.

The AMC method described above may include a function of determining the number, a rank, precoding, or the like of a spatial layer of a transmitted signal when used together with a system supporting multiple input multiple output (MIMO). In this case, the AMC method not only considers a coding rate and a modulation method, but also considers the number of layers to which transmission will be made using MIMO, in determining an optimum data rate.

In order to support the AMC operation, the terminal performs an operation of channel state information (CSI) reporting to the base station. The terminal measures CSI by referring to a reference signal (RS) transmitted by the base station. The reference signal includes a cell-specific reference signal (CRS) or a channel status information reference signal (CSI-RS). A time-frequency resource and a signal format to which the CRS and the CSI-RS are mapped accord with a pre-defined configuration.

The CSI includes at least one of an channel quality indicator (CQI), a precoding matrix indicator (PMI), and a rank indicator (RI). The CQI represents a signal to interference and noise ratio (SINR) for a wideband or subband of the system. The CQI is generally represented in a form of modulation and coding scheme (MCS) for satisfying predetermined data reception performance. The PMI provides precoding information required when the base station transmits data through multiple antennas in the system supporting the MIMO. The RI provides rank information required when the base station transmits data through multiple antennas in the system supporting the MIMO. The CSI is information provided by the terminal to the base station to help scheduling determination of the base station, and an actual value of an MCS, precoding, a rank, or the like that the base station applies to data transmission depends on determination of the base station.

In the LTE and LTE-A system, in a case in which decoding failure occurs during initial transmission, a hybrid automatic repeat request (HARQ) scheme in which the corresponding data is retransmitted in a physical layer is used. In the HARQ scheme, when a receiver did not accurately decode data, the receiver transmits information informing of decoding failure (negative acknowledgement, NACK) to a transmitter, such that the transmitter may retransmit the corresponding data in the physical layer. The receiver combines the data retransmitted by the transmitter with the data previously failed to be decoded to increase data reception performance. Further, when the receiver accurately decodes the data, the receiver transmits information informing of decoding success (acknowledgement, ACK) to the transmitter, such that the transmitter transmits new data.

Control information such as HARQ ACK/NACK, CSI, and the like fed back by the terminal to the base station is called uplink control information. In the LTE and LTE-A system, the UCI is transmitted to the base station through a physical uplink control channel (PUCCH) which is an uplink control channel dedicated for control information, or transmitted to the base station while being multiplexed with data to be transmitted by the terminal in a physical uplink shared channel (PUSCH) which is a physical channel for uplink data transmission.

FIG. 1 is a diagram illustrating a basic structure of a time-frequency resource region that is a radio resource region in which the data or control channel is transmitted of the LTE and LTE-A system.

In FIG. 1, a horizontal axis represents a time domain, and a vertical axis represents a frequency domain. A minimum transmission unit in the time domain is an OFDM symbol in the case of downlink, and is an SC-FDMA symbol in the case of uplink, and $N_{symb}$ symbols 102 configure one slot 106, and 2 slots configure one subframe 105. A length of the slot is 0.5 ms, and a length of the subframe is 1.0 ms. Further, a radio frame 114 is a time domain unit configured of 10 subframes. A minimum transmission unit in the frequency domain is a subcarrier, and a bandwidth of entire system transmission band is a total of $N_{BW}$ subcarriers 104.

In the time-frequency domain, a basic unit of a resource is a resource element (RE) 112, which may be indicated by an OFDM symbol index or SC-FDMA symbol index and a subcarrier index. A resource block (RB) (or physical resource block, PRB) 108 is defined as $N_{symb}$ continuous OFDM symbols 102 or $N_{symb}$ continuous SC-FDMA symbols 102 in the time domain, and $N_{RB}$ continuous subcarriers 110 in the frequency domain. Therefore, one RB 108 is configured of $N_{symb} \times N_{RB}$ REs 112. Generally, a minimum transmission unit of the data is the RB unit. The number $N_{symb}$ of SC-FDMA symbols or OFDM symbols is determined depending on a length of cyclic prefix (CP) added for each symbol in order to prevent interference between symbols. For example, if a normal CP is applied, $N_{symb}=7$, and if an extended CP is applied, $N_{symb}=6$. $N_{BW}$ and $N_{RB}$ are in proportion to a bandwidth of a system transmission band. A data rate is increased in proportion to the number of RBs scheduled to the terminal. The LTE and LTE-A system defines and operates 6 transmission bandwidths. In a case of the FDD system operated by dividing the downlink and the uplink with frequency, a downlink transmission bandwidth and an uplink transmission bandwidth may be different from each other. A channel bandwidth represents an RF bandwidth corresponding to the system transmission bandwidth. The following Table 1 shows a corresponding relationship between the system transmission bandwidth and the channel bandwidth defined in the LTE system. For example, in an LTE and LTE-A system having 10 MHz of channel bandwidth, a transmission bandwidth thereof is 50 RBs.

TABLE 1

| | Channel bandwidth $BW_{Channel}$ [MHz] | | | | |
|---|---|---|---|---|---|
| | .4 | | 0 | 5 | 0 |
| Transmission bandwidth configuration $N_{RB}$ | 5 | 5 | 0 | 5 | 00 |

Figure 2:
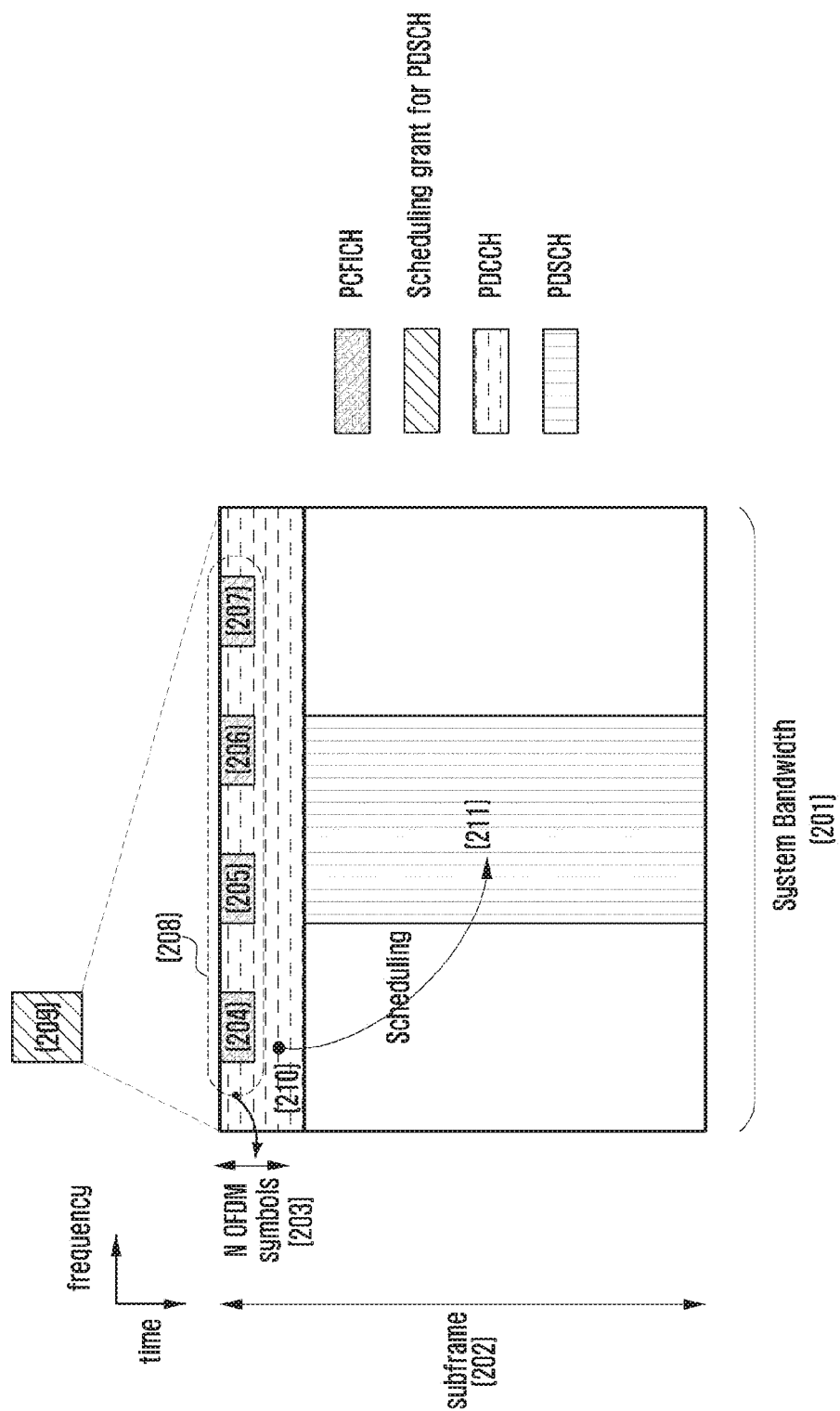
FIG. 2 is a diagram illustrating a mapping structure of a downlink control channel and a downlink data channel in the LTE and LTE-A system.

FIG. 2 illustrates a mapping structure of a downlink control channel and a downlink data channel in the LTE and LTE-A system; In the LTE and LTE-A system, downlink control information is transmitted within first N OFDM symbols in the subframe 202. In general, N={1, 2, 3}. Accordingly, the N value varies for each subframe depending on an amount of control information to be transmitted in the current subframe. The control information includes a control field indicator (CFI) indicating the number of OFDM symbols within which the control information is transmitted, scheduling information on downlink data or uplink data (downlink control information (DCI)), and the like.

The CFI 203 is transmitted through a physical control format indicator channel (PCFICH) 208 which is a physical control channel for CFI transmission. The CFI is mapped to four resource element groups (REGs) 204, 205, 206, and 207 that are away from each other by a uniform distance over a system transmission band in the frequency domain, and mapped to a first OFDM symbol in a subframe in the time domain. The REG is configured of four continuous REs.

The DCI 209 is transmitted through a physical downlink control channel (PDCCH) 210. In general, the DCI is independently channel-coded for each terminal and then transmitted while being configured for an independent PDCCH, respectively. The PDCCH is transmitted during an OFDM symbol duration indicated by the CFI transmitted through the PCFICH. A mapping position of a frequency domain of the PDCCH is determined by an ID of each terminal and spread over entire system transmission band 201.

The base station operates the DCI for a terminal to be scheduled, by applying a certain DCI format determined depending on whether it is the scheduling information (downlink (DL) grant) on the downlink data or the scheduling information (uplink (UP) grant) on the uplink data, whether it is compact DCI having small control information, whether spatial multiplexing using multiple antennas is applied, whether it is DCI for power control, or the like.

The downlink data is transmitted through a physical downlink shared channel (PDSCH) 211 that is a physical channel for downlink data transmission. The PDSCH is transmitted after the control channel transmission period, and scheduling information such as a specific mapping position in the frequency domain, a modulation scheme, and the like are informed by the base station to the terminal through scheduling information for downlink data in the DCI that is transmitted through the PDCCH.

The uplink data is transmitted through a physical uplink shared channel (PUSCH) that is a physical channel for uplink data transmission. Scheduling information of the PUSCH such as a specific mapping position in the frequency domain, a modulation scheme, and the like are informed by the base station to the terminal through scheduling information for uplink data in the DCI that is transmitted through the PDCCH.

The LTE-A system may support a wider bandwidth than the LTE system for high speed data transmission. Further, in order for the LTE-A system to maintain backward compatibility for the existing LTE terminals, the LTE terminals also need to be able to access the LTE-A system to receive services. To this end, the LTE-A system may divide the entire system band into component carriers (CC) of a bandwidth that may be transmitted or received by the LTE terminal and aggregate several component carriers to provide a service to the terminal. The LTE-A system generates and transmits data for each component carrier, thereby supporting high speed data transmission of the LTE-A system by using a transmission and reception process of the existing LTE system for each component carrier. As such, the LTE-A system supports aggregation of up to five carriers by a carrier aggregation (CA) technology in which LTE carriers are aggregated, and may accordingly provide a broadband service of up to 100 MHz (20 MHz×5) bandwidth.

Figure 3:
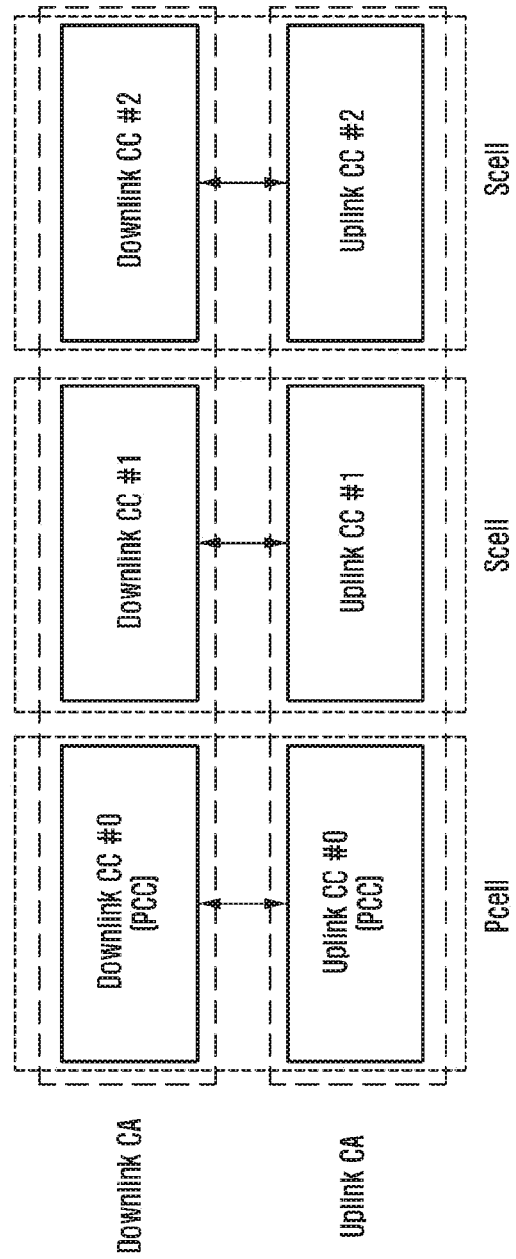
FIG. 3 is a diagram illustrating a concept of carrier aggregation (CA) of the LTE-A system.

FIG. 3 illustrates an example in which three component carriers are aggregated to configure the LTE-A system for each of uplink and downlink. In the carrier aggregation system, each component carrier is operated by being classified into Pcell and Scell. The Pcell (primary cell or first cell) provides a basic radio resource to the terminal, and means a cell based on which an operation of the terminal such as initial access and handover is performed. The Pcell is configured by downlink primary frequency (or primary component carrier (PCC)), and uplink primary frequency. The terminal may transmit UCI including control information such as HARQ ACK/NACK or CSI fed back to the base station through a physical uplink control information (PUCCH), and the PUCCH may be transmitted through the Pcell. Further, the Scell (secondary cell or second cell) is a cell providing an additional radio resource to the terminal together with the Pcell, and is configured by downlink secondary frequency (or secondary component carrier (SCC)) and uplink secondary frequency, or downlink secondary frequency. In describing the present disclosure, unless indicated otherwise, the term "cell" and the term "component carrier" are mixedly used. Which component carrier is configured as a primary carrier and operated is informed by the base station to the terminal through base station signaling. Generally, the number of aggregated component carriers is configured through higher layer signaling.

According to the broadband transmission and reception method using the carrier aggregation technology described above, as independent control information and data are generated and transmitted for each component carrier, the larger the number of component carriers, the larger the signaling overhead for data scheduling. Therefore, according to the embodiment of the present disclosure, the method for efficient broadband transmission and reception in which signaling overhead is not large is defined, and various examples therefor are provided.

Figure 4:
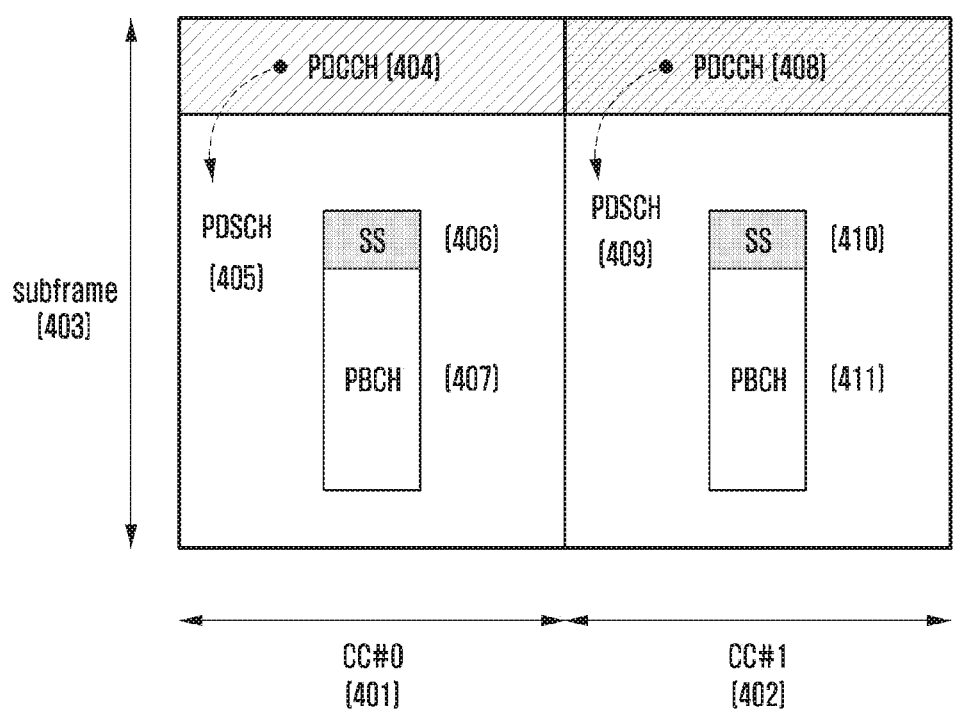
FIG. 4 is a diagram illustrating a method for scheduling broadband data in the LTE-A system in which the carrier aggregation is applied.

First, a method for transmitting broadband data to a predetermined terminal in the LTE-A system in which the carrier aggregation is applied will be described with reference to an example of FIG. 4. As described above, in the carrier aggregation system, independent control information and data are generated and transmitted for each component carrier. In the example of FIG. 4 configured by two component carriers CC #0 and CC #1, the base station transmits a PDCCH 404 for scheduling a PDSCH 405 of the CC #0 and a PDCCH 408 for scheduling a PDSCH 409 of the CC #1 to the terminal, respectively, in order to transmit downlink data (PDSCH) 405 and 409 to any terminal across the CC #0 401 and the CC #1 402 in one subframe 403. That is, a maximum bandwidth of the PDSCH that may be scheduled by each PDCCH is limited within a system bandwidth of each component carrier. Further, a PCFICH is transmitted for each component carrier in order to inform the number of OFDM symbols across which the PDCCH is transmitted.

In the carrier aggregation system, each CC needs to satisfy backward compatibility for providing a service even to a terminal that does not support the carrier aggregation. Therefore, the base station transmits physical broadcast channels (PBCH) 407 and 411 configured of system information including synchronization signals 406 and 410 required for initial access of the terminal and downlink system transmission bandwidth information in each CC, in addition to the PDCCH, PDSCH, and PCFICH. The terminal synchronizes time and frequency with a corresponding cell and acquires a cell ID from the synchronization signal. Further, although not illustrated in FIG. 4, the base station transmits a cell-specific reference signal (CRS) in each CC. The CRS is needed to measure downlink radio link quality of each cell for supporting mobility or measure CSI for supporting downlink scheduling of the base station by the terminal.

Figure 5:
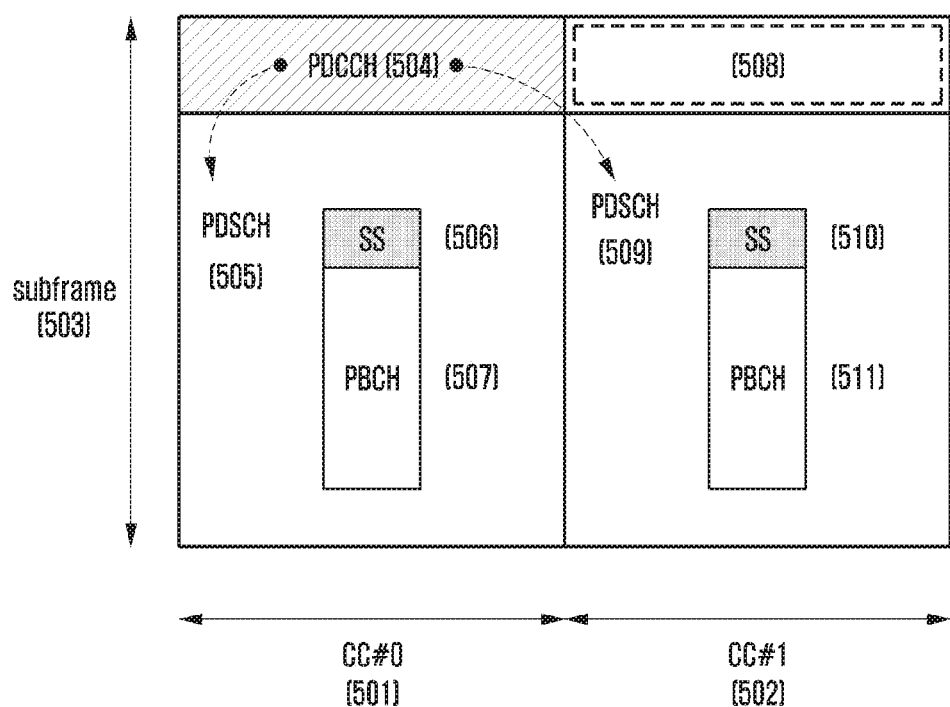
FIG. 5 is a diagram illustrating a method for providing a broadband data service in a broadband transmission mode according to the present disclosure.

Hereinafter, a gist of the present disclosure will be described with reference to FIG. 5. FIG. 5 is a diagram illustrating a method for providing a broadband data service by a method different from the carrier aggregation technology. Hereinafter, for convenience of explanation, a data transmission and reception operation as in FIG. 5 will be called "broadband transmission mode". FIG. 5 illustrates a system configured by two component carriers CC #0 and CC #1. However, the embodiment of the present disclosure is not limited thereto, and may also be expanded to a system configured by three or more component carriers. The base station transmits one PDCCH 504 to the terminal in the CC #0 in order to transmit downlink data (PDSCH) 505 and 509 to any terminal across the CC #0 501 and the CC #1 502 in one subframe 503 in the broadband transmission mode. That is, unlike the case of FIG. 4, a maximum bandwidth of the PDSCH that may be scheduled by one PDCCH is expanded to a total sum of system bandwidths of respective component carriers. A component carrier in which the PDCCH is transmitted may be defined as a Pcell, or informed by the base station to the terminal through higher layer signaling. As compared with the example of FIG. 4, in the example of FIG. 5, an effect of decreasing PDCCH signaling overhead by half may be obtained. The effect of decreasing the signaling overhead may be increased as the number of component carriers is increased.

In the example of FIG. 5, since the PDCCH for scheduling the PDSCH is not transmitted in the CC #1, the corresponding resource 508 may be used for other purpose. For example, data transmission speed may be improved by using the corresponding radio resource 508 as an additional radio resource for PDSCH transmission. If the base station intends to perform data scheduling for other terminal accessing the CC #1 and operated, the PDCCH transmission may be performed in the CC #1 like the operation of the existing LTE system.

In the example of FIG. 5, the base station may maintain backward compatibility by transmitting synchronization signals (SS) 506 and 510, PBCHs 507 and 511, and a CRS (not illustrated) in the respective component carriers. Alternatively, in some cases, for example, if the base station does not need to maintain backward compatibility, synchronization signals (SS) 506 and 510, PBCHs 507 and 511, and a CRS (not illustrated) may be omitted for at least one of the respective component carriers. In the example of FIG. 5, a case in which the CC #0 and the CC #1 are adjacent to each other in the frequency domain is illustrated, the main operation of the present disclosure may also be applied to a case in which the respective component carriers are away from each other in the frequency domain.

Hereinafter, the main operation of the present disclosure will be described through detailed embodiments.

First Embodiment

The first embodiment describes a method for configuring a broadband transmission mode of the terminal in the broadband system operated in the "broadband transmission mode" as described with reference to FIG. 5.

Figure 6:
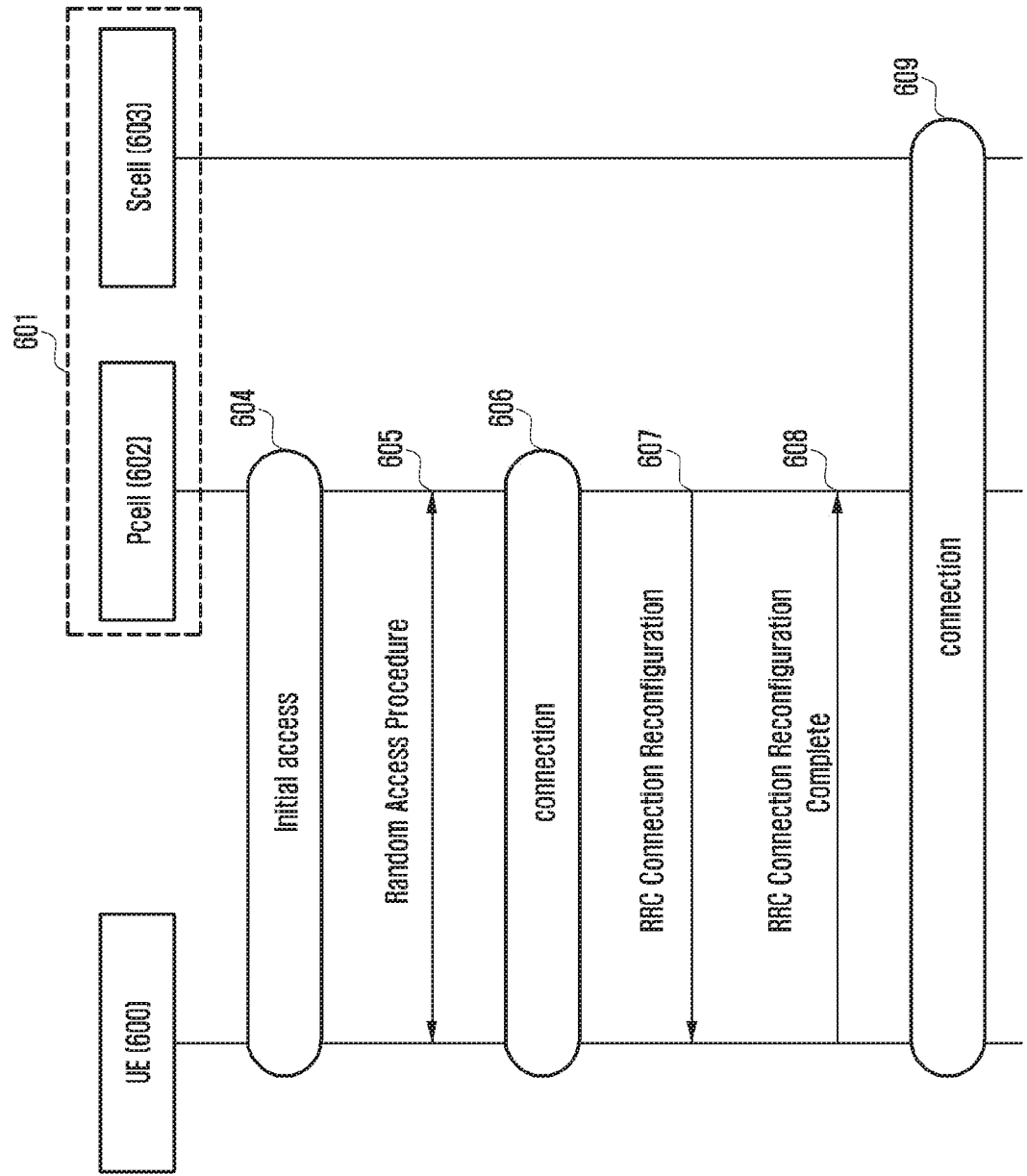
FIG. 6 is a diagram illustrating a method for configuring a broadband transmission mode according to a first embodiment of the present disclosure.

Hereinafter, an overall process of the first embodiment will be described with reference to FIG. 6. In step 604, a terminal 600 performs initial access to a base station 601. The terminal synchronizes time and frequency with a corresponding cell and acquires a cell ID from the synchronization signal in the initial access process. Further, the terminal receives a PBCH using the acquired cell ID, and acquires a master information block (MIB) which is essential system information from the PBCH. The MIB includes information such as downlink system transmission bandwidth information, a system frame number (SFN) which is a frame unit index that is a timing reference. The terminal additionally acquires cell common transmission and reception control information from a system information block (SIB) transmitted by the base station. The cell common transmission and reception control information includes random access-related control information, paging-related control information, common control information for various physical channels, and the like. A cell accessed by the terminal in step 604 becomes a Pcell. In step 605, the terminal performs random access to the base station using the random access-related control information acquired from the system information. Through the random access process, the terminal synchronizes uplink time with the base station, and acquires UE-specific configuration information related to transmission and reception between the terminal and the base station.

Thereafter, in step 606, the terminal performs data transmission and reception with the base station through the Pcell. In step 606, the terminal may perform a measurement report for neighboring cells. For example, if strength of a received signal from neighboring cells observed by the terminal is greater than a predetermined threshold, ID of the corresponding cell and the strength of the received signal may be included in the measurement report and transmitted to the base station. An example of a reference signal observed by the terminal for the measurement report may include a CRS of a neighboring cell.

The base station may determine whether to configure the broadband transmission mode for the terminal by referring to the measurement report of the terminal. The determination of whether to configure the broadband transmission mode may be performed by, for example, determining whether to combine frequency bands of the carrier. If the base station determines to configure the broadband transmission mode for the terminal (for example, combining frequency bands of Scell by an operation of Scell combination), in step 607, the base station may include relevant information required for the Scell frequency band combination of the terminal in an "RRC connection reconfiguration", and transmit the message to the terminal. In this case, the base station may control, for example, both of the Pcell and the Scell.

The relevant information required for configuring the broadband transmission mode (for example, Scell frequency band combination) may include at least one of downlink carrier bandwidth information of the Scell, information related to PSDCH mapping of the Scell, and scrambling ID information for the PDSCH of the Scell.

The information related to the PDSCH mapping of the Scell may include control information such as from which OFSM symbol the PDSCH of the Scell is mapped, whether the PDSCH is mapped according to the PCFICH of the Scell, or whether the PBCH and/or synchronization signal of the Scell is transmitted. If the PBCH and/or synchronization signal of the Scell is not transmitted, the PDSCH may be mapped to a corresponding RE.

The scrambling ID information for the PDSCH of the Scell may include control information such as whether data scrambling in the Scell is performed independent from the Pcell, or whether data scrambling in the Scell is performed together with the Pcell.

Further, the relevant information required for configuring the broadband transmission mode may additionally include at least one of information of antenna configuration of the Scell, information of a bandwidth and center frequency of uplink component carrier of the Scell, information related to physical random access channel transmission of the Scell, information related to uplink power control of the Scell, information related to CSI transmission for the Scell, information related to SRS transmission for the Scell, and information related to downlink and uplink data transmission of the Scell.

The terminal performs a preparation process for performing communication with the Scell according to the received "RRC connection reconfiguration" message, and then transmits an "RRC connection reconfiguration complete" message to the base station in step 608. After completing the processes up to step 608, from step 609, the terminal is in a state in which preparation for performing data transmission and reception with the Scell of the base station is completed, and performs data transmission and reception according to scheduling of the base station.

The process of configuring the broadband transmission mode may be performed by a transmission mode configuration/change operation, other than the Scell combination operation. In this case, the "RRC connection reconfiguration" message includes control information related to the configuration/change of the transmission mode, which includes relevant information required for configuring the broadband transmission mode.

Second Embodiment

The second embodiment describes a method for configuring DCI for data scheduling in the broadband system operated in the "broadband transmission mode" as described with reference to FIG. 5. That is, the base station schedules downlink data transmitted across several component carriers through a PDCCH transmitted in a pre-designated component carrier. In this case, a maximum bandwidth of the PDSCH that may be scheduled by one PDCCH is expanded to the sum of system bandwidths of the respective component carriers.

The DCI for data scheduling configured by the PDCCH includes HARQ-relevant control information, modulation and coding scheme (MCS)-relevant control information, and resource block allocation control information. The HARQ-relevant control information may include at least one of a new data indicator (NDI) indicating whether it is HARQ initial transmission or HARQ retransmission, a redundancy version (RV) indicating a transmission pattern of the HARQ, and HARQ process ID information. The MCS-relevant control information notifies a modulation scheme used for data transmission and a size of a transport block (TB) that is data desired to be transmitted. The resource block allocation control information notifies a resource block allocated for data transmission. A size of the resource block allocation control information may be determined according to a system bandwidth and resource allocation method. On the other hand, the HARQ-relevant control information, and the MCS-relevant control information is irrelevant to the system bandwidth and may maintain a fixed bit size.

In the LTE and LTE-A system, the resource allocation method may include Types 1 and 2 below.

Type 1: A resource is allocated in a unit of resource block group (RBG) by applying a bitmap scheme. The RBG is a group configured of P continuous RBs, and is determined according to the system bandwidth. For example, in the LTE system in which the system bandwidth is 100 RBs, P=4. The number of bits required to express Type 1 follows Mathematical Expression 1.

$$[N_{RB}/P] \qquad \text{[Mathematical Expression 1]}$$

Type 2: Type 2 is a method of allocating a resource in a unit of RB, in which resources for k (k>0) continuous RBs from a reference RB are allocated. The number of bits required to express Type 2 follows Mathematical Expression 2.

$$[\log_2(N_{RB}(N_{RB}+1)/2] \qquad \text{[Mathematical Expression 2]}$$

In Mathematical Expressions 1 and 2, $N_{RB}$ represent the number of RBs according to a bandwidth of a system transmission band of each component carrier.

In the second embodiment, the number of bits required to express each type of resource allocation method is defined by the following two cases. A maximum bandwidth of the PDSCH that may be scheduled by one PDCCH is expanded to the sum of system bandwidths of the respective component carriers.

Method A: A resource allocation unit P of the existing LTE and LTE-A system is maintained as it is, and the number of entire bits is increased as compared to the existing LTE and LTE-A system, in proportion to the sum of the system bandwidths of the respective component carrier.

Method B: A resource allocation unit is defined as P' (P'>P) in comparison to the existing LTE and LTE-A system, and the number of entire bits is maintained to be the same as that in the existing LTE and LTE-A system. In this case, the number of bits required to express Type 1 follows Mathematical Expression 3, and the number of bits required to express Type 2 follows Mathematical Expression 4.

$$[N_{RB}^{tot}/P'] \qquad \text{[Mathematical Expression 3]}$$

Here, P' is in proportion to the number N of aggregated carriers, and may be defined as, for example, P'=N×P.

$$[\log_2(N_{RB}^{tot}/P'(N_{RB}^{tot}/P'+1)/2] \qquad \text{[Mathematical Expression 4]}$$

Here, P' is in proportion to the number N of aggregated carriers, and may be defined as, for example, P'=N. Further, in Mathematical Expressions 3 and 4, $N_{RB}^{tot}$ represents the sum of the number of RBs of the aggregated carriers.

Table 2 shows an example of the number of required bits in cases of applying Methods A and B, respectively, for each of Types 1 and 2 of the resource application method.

TABLE 2

| Number N of Aggregated Carriers | Sum of Number of RBs of Aggregated Carriers | Type 1 Method A (P = 4) | Type 1 Method B (P' = N×P) | Type 2 Method A | Type 2 Method B (P' = N) |
|---|---|---|---|---|---|
| 1 (That is, not CA) | 100 | 25 | 25 | 13 | 13 |
| 2 | 200 | 50 | 25 | 15 | 13 |
| 5 | 500 | 125 | 25 | 17 | 13 |

Figure 7:
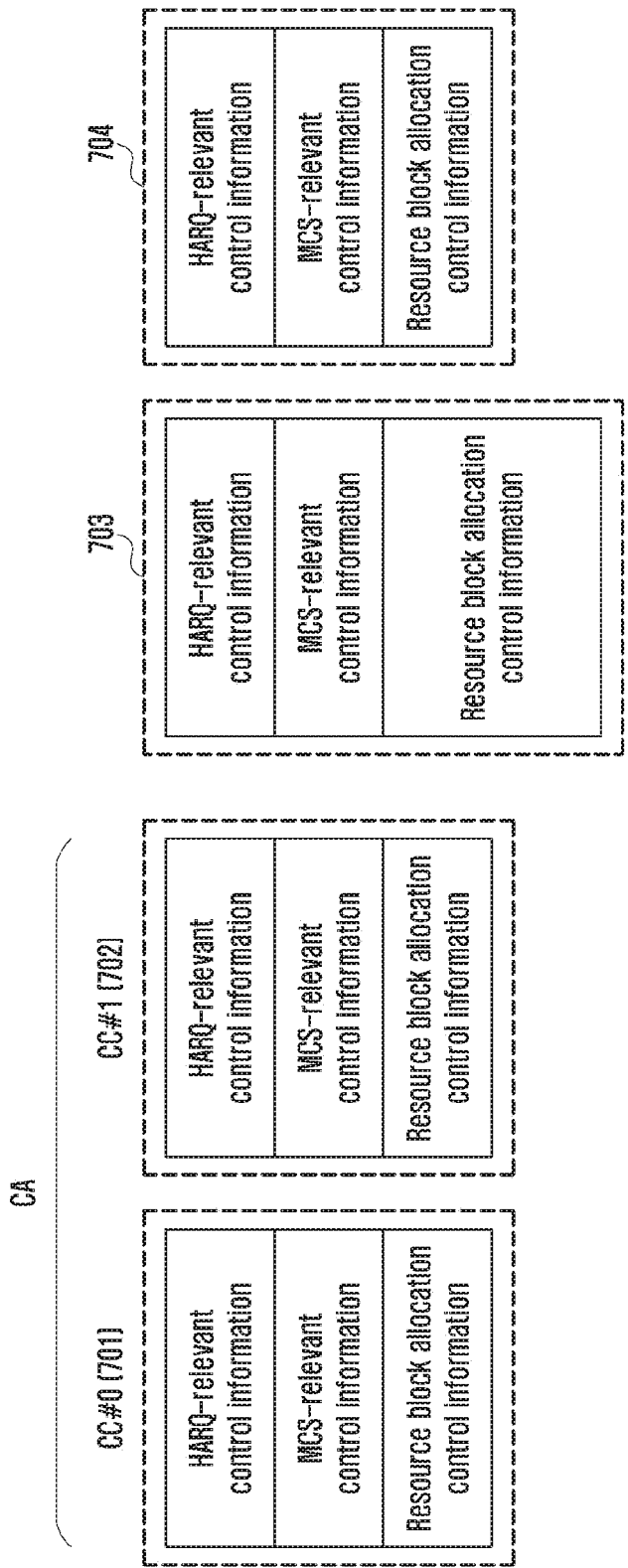
FIG. 7 is a diagram illustrating a concept of DCI configuration according a second embodiment of the present disclosure.

FIG. 7 is a diagram illustrating a concept of DCI configuration according the second embodiment, in comparison with the case of carrier aggregation. In the case of carrier aggregation system configured by two component carriers, DCI for each CC are configured as reference numerals 701 and 702, respectively. If system bandwidths of the respective CCs are the same as each other, and the resource allocation method is the same, the number of bits required to express the resource block allocation control information for each CC is the same. When intending to perform PDSCH scheduling in CC #0 and CC #1 in the same subframe, the base station performs transmission by configuring DCI corresponding to the reference numerals 701 and 702 for the respective CCs. On the other hand, according to the second embodiment, when intending to perform PDSCH scheduling in the CC #0 and the CC #1 in the same subframe, the base station may perform transmission by configuring DCI corresponding to reference numeral 703 (in the case according to Method A) or reference numeral 704 (in the case according to Method B). That is, an effect of decreasing overall DCI overhead as compared to the carrier aggregation system may be obtained. According to which one of Method A and Method B the DCI is to be configured is notified by the base station to the terminal through signaling, or a pre-agreed method is applied.

Figure 8:
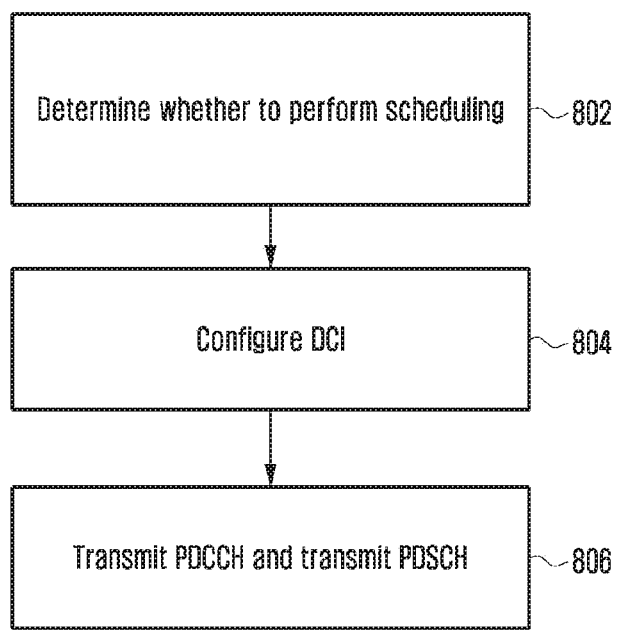
FIG. 8 is a diagram illustrating a base station process according to the second embodiment of the present disclosure.

FIG. 8 illustrates a base station process according to the second embodiment. In step 802, the base station determines whether to perform scheduling for PDSCH transmission to a predetermined terminal. In the process of determining whether to perform scheduling, the base station determines whether the terminal is configured in the "broadband transmission mode" as described with reference to FIG. 5. In step 802, if the base station determines to perform PDSCH scheduling for the terminal configured in the "broadband transmission mode", in step 804, the base station configures the resource block allocation control information according to Method A or Method B described in the second embodiment, and configures DCI together with the HARQ-relevant control information and the MCS-relevant control information. In step 806, the base station may generate the configured DCI as PDCCH and perform transmission. Further, the base station may transmit a PDSCH scheduled by the PDCCH to the terminal. In step 802, if the base station determines to perform PDSCH scheduling for the terminal that is not configured in the "broadband transmission mode", in step 804, the base station configures DCI according to the DCI configuration method of the existing LTE and LTE-A system, and in step 804, a PDCCH is generated and transmitted to the terminal. Further, a PDSCH desired to be scheduled by the PDCCH is transmitted to the terminal.

Figure 9:
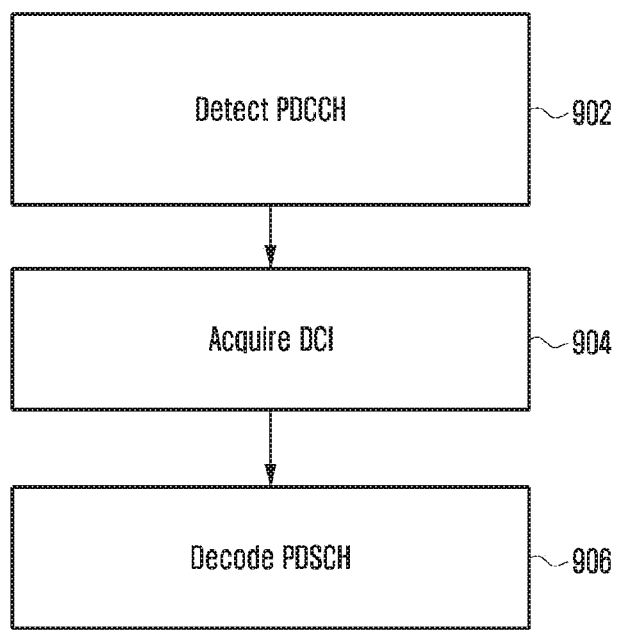
FIG. 9 is a diagram illustrating a terminal process according to the second embodiment of the present disclosure.

FIG. 9 illustrates a terminal process according to the second embodiment. In step 902, the terminal attempts to detect the PDCCH received from the base station. If the terminal is configured in the "broadband transmission mode", the terminal may attempt to detect the PDCCH determined according to the DCI configuration method of the second embodiment. If the terminal succeeds in the PDCCH decoding, in step 804, the terminal acquires DCI from the PDCCH according to the DCI configuration method of the second embodiment. Further in step 806, the terminal performs decoding of the received PDSCH according to the control information of the acquired DCI. In step 902, if the terminal is not configured in the "broadband transmission mode", the terminal attempts to detect the PDCCH determined according to the DCI configuration method of the existing LTE and LTE-A system, and then the process of acquiring the DCI and PDSCH decoding also follows the operation of the existing LTE and LTE-A system.

According to various examples of the present disclosure, as in the second embodiment, in the system operated in the "broadband transmission mode", the base station may perform DCI configuration according to the DCI configuration method defined in the existing LTE and LTE-A system without a separate process of "RRC connection reconfiguration" and PDCCH transmission. (The operation as described above is defined as a fallback operation.) If it is determined that the PDCCH reception performance may be improved through the fallback operation, the base station may perform the fallback operation. In this case, the terminal configured in the "broadband transmission mode" may perform PDCCH decoding in consideration of both of the DCI configuration method of the second embodiment, and the DCI configuration method of the existing LTE and LTE-A system, at the time of PDCCH detection.

The second embodiment has been described based on the downlink data scheduling, but may also be applied to the case of uplink data scheduling.

Third Embodiment

The third embodiment describes a method for mapping scheduled data in the broadband system operated in the "broadband transmission mode" as described with reference to FIG. 5. The data mapping may be independently performed for each component carrier (FIGS. 10A and 10B), or performed across the sum of system bandwidths of the respective component carriers (FIGS. 11A and 11B).

Figure 10A:
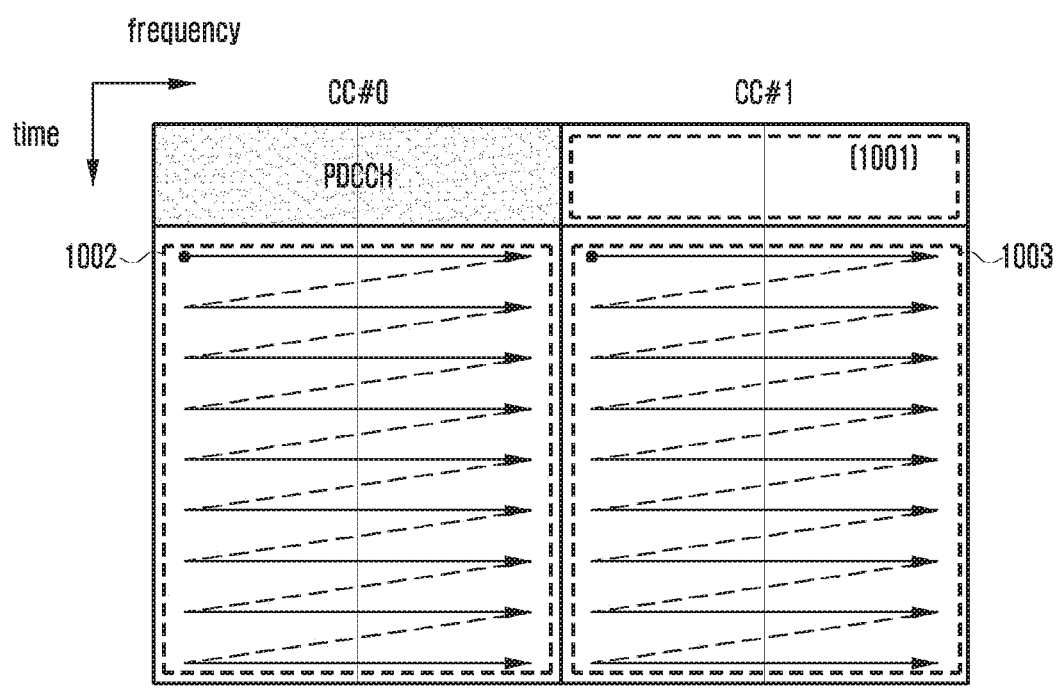
FIGS. 10A and 10B are diagrams illustrating an example of a method for mapping data in a broadband transmission mode according to a third embodiment of the present disclosure.

FIG. 10A illustrates an example in which data mapping is performed for each component carrier. A PDCCH for supporting the "broadband transmission mode" is transmitted while being mapped to one designated component carrier CC #0, and is not transmitted in the other component carrier CC #1. In FIG. 10A, a control channel transmission period 1001 of the CC #1 may be used for PDCCH mapping for the terminal that does not support the "broadband transmission mode". Accordingly, a resource region in which PDSCH mapping is possible for the terminal that supports the "broadband transmission mode" corresponds to reference numeral 1002 or 1003. The base station may independently map the PDSCH desired to be scheduled, dividedly for each component carrier, in reference numerals 1002 and 1003. At this time, the PDSCH may be mapped in a frequency-first manner from the lowest OFDM symbol index in which the PDSCH mapping is possible, for each component carrier. The mapping in the frequency-first manner refers to an operation in which symbols desired to be mapped are first mapped to a frequency domain resource of the lowest time domain index, and when the mapping to all frequency domain resources in the corresponding time domain index is completed, symbol mapping to the frequency domain resources is repeatedly performed while sequentially increasing the time domain index.

Figure 10B:
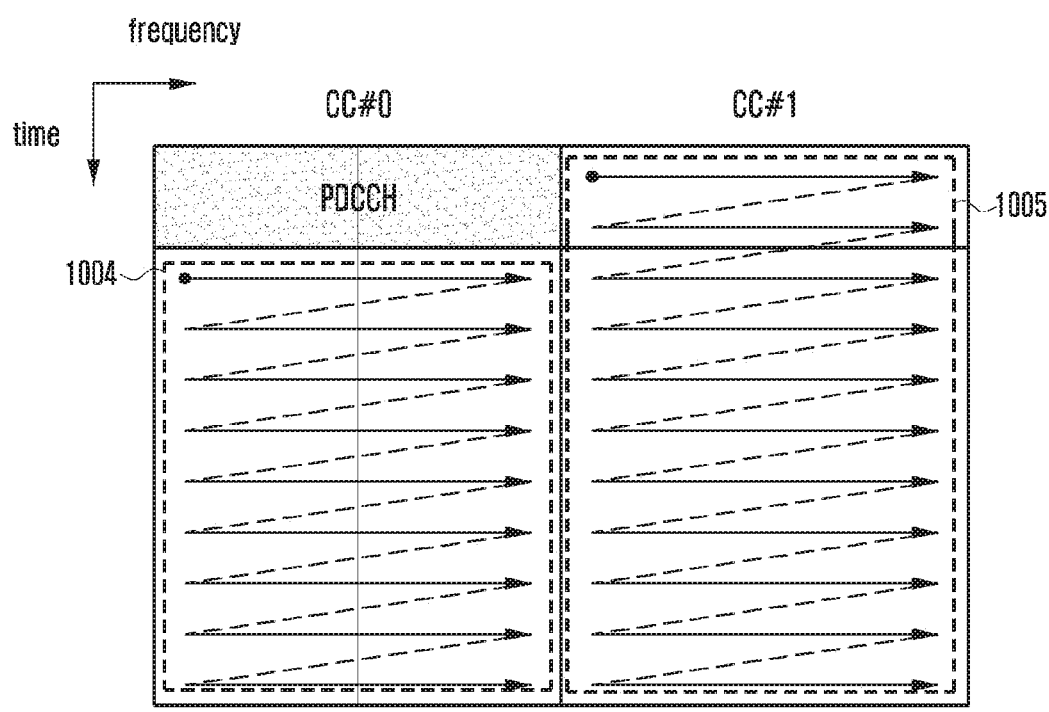

FIG. 10B illustrates another example in which data mapping is performed for each component carrier. A PDCCH for supporting the "broadband transmission mode" is transmitted while being mapped to one designated component carrier CC #0, and is not transmitted in the other component carrier CC #1. Unlike the case of FIG. 10A, in FIG. 10B, a control channel transmission period of the CC #1 may not be used for PDCCH mapping for the terminal that does not support the "broadband transmission mode" and may be used for PDSCH mapping of the terminal that supports the "broadband transmission mode". Accordingly, a resource region in which PDSCH mapping is possible for the terminal that supports the "broadband transmission mode" corresponds to reference numeral 1004 or 1005. The base station independently maps the PDSCH desired to be scheduled, dividedly for each component carrier, in reference numerals 1004 and 1005. At this time, the PDSCH may be mapped in a frequency-first manner from the lowest OFDM symbol index in which the PDSCH mapping is possible, for each component carrier.

Figure 11A:
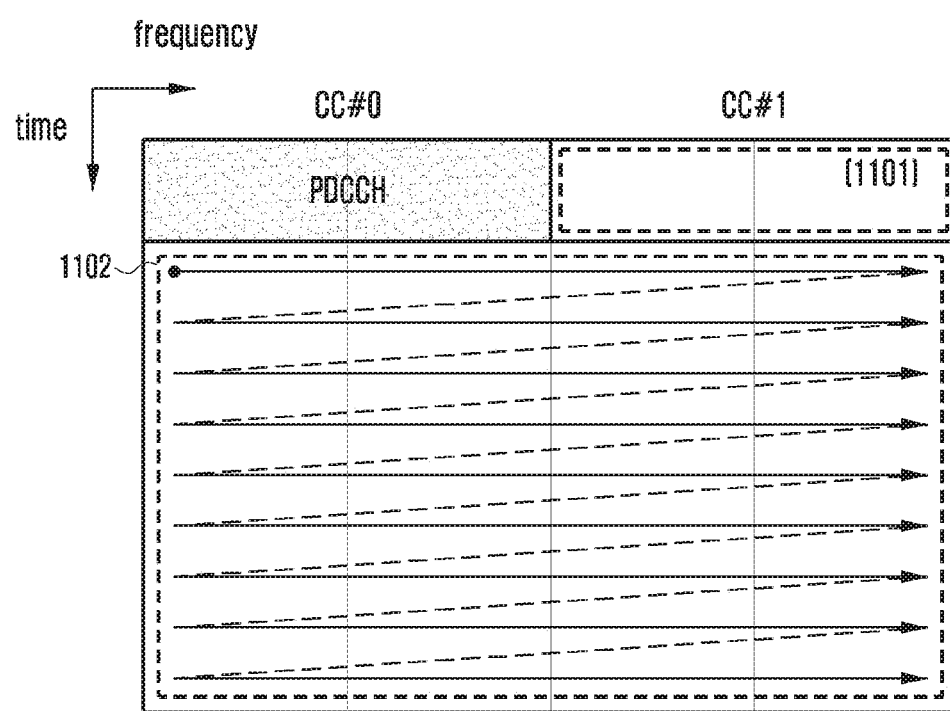
FIGS. 11A and 11B are diagrams illustrating another example of the method for mapping data in a broadband transmission mode according to the third embodiment of the present disclosure.
Figure 11B:
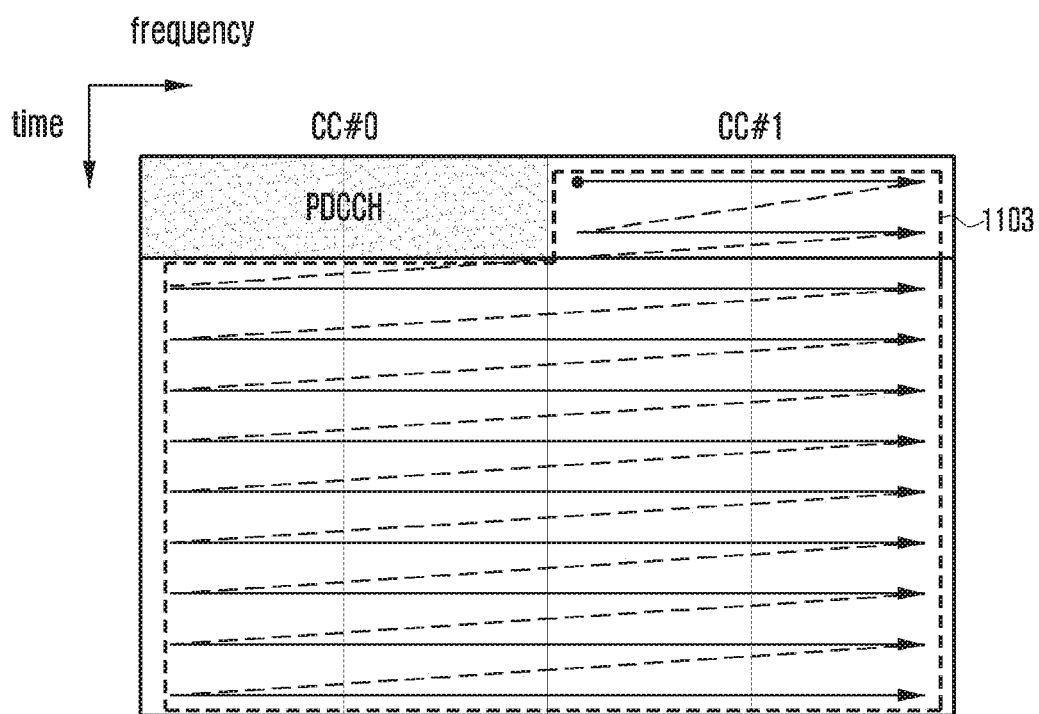

FIG. 11A illustrates an example in which data mapping is performed across the sum of system bandwidths of the respective component carriers. A PDCCH for supporting the "broadband transmission mode" is transmitted while being mapped to one designated component carrier CC #0, and is not transmitted in the other component carrier CC #1. In FIG. 11A, a control channel transmission period 1101 of the CC #1 may be used for PDCCH mapping for the terminal that does not support the "broadband transmission mode". Accordingly, a resource region in which PDSCH mapping is possible for the terminal that supports the "broadband transmission mode" corresponds to reference numeral 1102. The base station maps the PDSCH desired to be scheduled, for the sum of the system bandwidths of the respective component carriers, in reference numeral 1102. At this time, the PDSCH may be mapped in the frequency-first manner from the lowest OFDM symbol index in which the continuous PDSCH mapping is possible, in reference numeral 1102 (that is, in the maximum system bandwidth).

FIG. 11B illustrates another example in which data mapping is performed across the sum of system bandwidths of the respective component carriers. A PDCCH for supporting the "broadband transmission mode" is transmitted while being mapped to one designated component carrier CC #0, and is not transmitted in the other component carrier CC #1. Unlike the case of FIG. 11A, in FIG. 11B, a control channel transmission period of the CC #1 may not be used for PDCCH mapping for the terminal that does not support the "broadband transmission mode" and may be used for PDSCH mapping of the terminal that supports the "broadband transmission mode". Accordingly, a resource region in which PDSCH mapping is possible for the terminal that supports the "broadband transmission mode" corresponds to reference numeral 1103. The base station maps the PDSCH desired to be scheduled, across the sum of the system bandwidths of the respective component carriers, in reference numeral 1103. At this time, the PDSCH may be mapped in the frequency-first manner from the lowest OFDM symbol index in which the continuous PDSCH mapping is possible, in reference numeral 1103 (that is, in the maximum system bandwidth).

Figure 12:
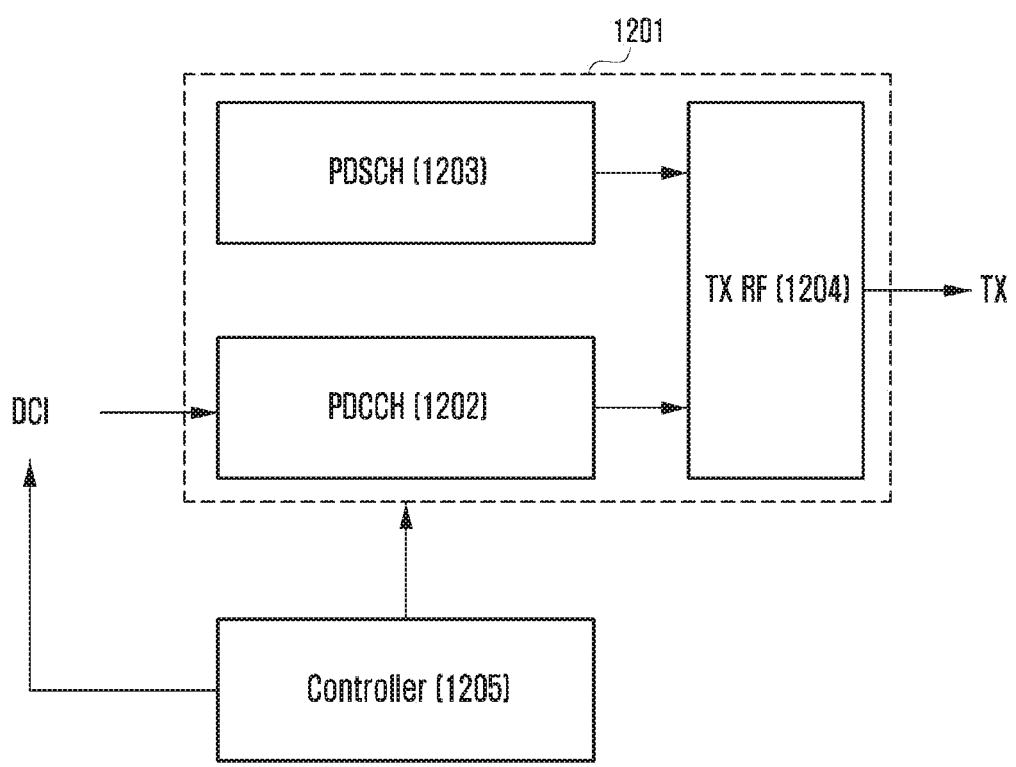
FIG. 12 is a diagram schematically illustrating a configuration of a base station according to the present disclosure.

FIG. 12 schematically illustrates a configuration of a base station according to the present disclosure. For convenience of explanation, illustration and description for an apparatus that is not directly related to the present disclosure will be omitted.

Referring to FIG. 12, the base station may include a transceiver 1201 and a controller 1205.

The transceiver 1201 according to an embodiment of the present disclosure may transmit and receive a signal to and from an external apparatus (e.g., terminal or other base station). The transceiver 1201 may include, for example, a PDCCH block 1202, a PDSCH block 1203, and a transmission (TX) RF block 1204.

The controller 1205 according to the embodiment of the present disclosure may control DCI configuration according to whether the "broadband transmission mode" is configured and determination of whether to perform scheduling and control generation of a PDCCH and PDSCH and mapping to radio resources. The controller 1205 may control an operation of configuring the DCI according to the above-described detailed embodiment of the present disclosure.

The PDCCH block 1202 may generate a PDCCH by performing a process such as channel coding, modulation, or the like for the configured DCI. The PDSCH block 1203 may generate a PDSCH by performing a process such as channel coding, modulation, or the like for downlink data desired to be scheduled and transmitted by the PDCCH. The base station may perform RF signal processing on the generated PDCCH and PDSCH in the TX RF block 1204, and then perform transmission to the terminal.

For example, the controller 1205 according to the embodiment of the present disclosure may perform a control to transmit control information (e.g., DCI) corresponding to the broadband transmission mode to the terminal through a first bandwidth. The controller 1205 may perform a control to transmit downlink data having, as a maximum bandwidth, a bandwidth expanded as much as a second bandwidth from the first bandwidth, to the terminal, based on the control information.

The controller 1205 is connected to the terminal by a first cell having the first bandwidth before transmitting the control information, and may perform a control to transmit a configuration message including configuration information of the broadband transmission mode to the terminal through the first cell.

The maximum bandwidth according to the embodiment of the present disclosure may be a bandwidth expanded as much as the second bandwidth of a second cell from the first bandwidth of the first cell. Further, the configuration information of the broadband transmission mode may include at least one of downlink bandwidth information of the second cell, downlink data mapping information of the second cell, and data scrambling information of the second cell. The downlink bandwidth information of the second cell may include second bandwidth information. The downlink data mapping information of the second cell may include at least one of information of a symbol in which mapping of a downlink data channel starts in the second cell, information on whether the downlink data channel is mapped according to a channel transmitting a control field indicator in the second cell, and information on whether at least one of a physical broadcast channel and a synchronization signal is transmitted in the second cell. The data scrambling information of the second cell may include information on whether data scrambling is independently performed in the second cell, or whether data scrambling in the second cell is performed together with the first cell.

The control information according to the embodiment of the present disclosure may include resource block allocation control information indicating a resource block allocated for transmission of the downlink data. Further, a size of the resource block allocation control information may be determined based on at least one of the maximum bandwidth and the resource allocation method. The resource allocation method may include a method of determining a unit of resource allocation based on the number of cells corresponding to the expanded bandwidth.

The downlink data according to the embodiment of the present disclosure may be mapped dividedly in the first and second bandwidths, or continuously mapped across the maximum bandwidth.

According to the embodiment of the present disclosure, the downlink data may be mapped to a control channel transmission period in the second bandwidth. According to the embodiment of the present disclosure, the first cell may be a Pcell, and the second cell may be an Scell.

Figure 13:
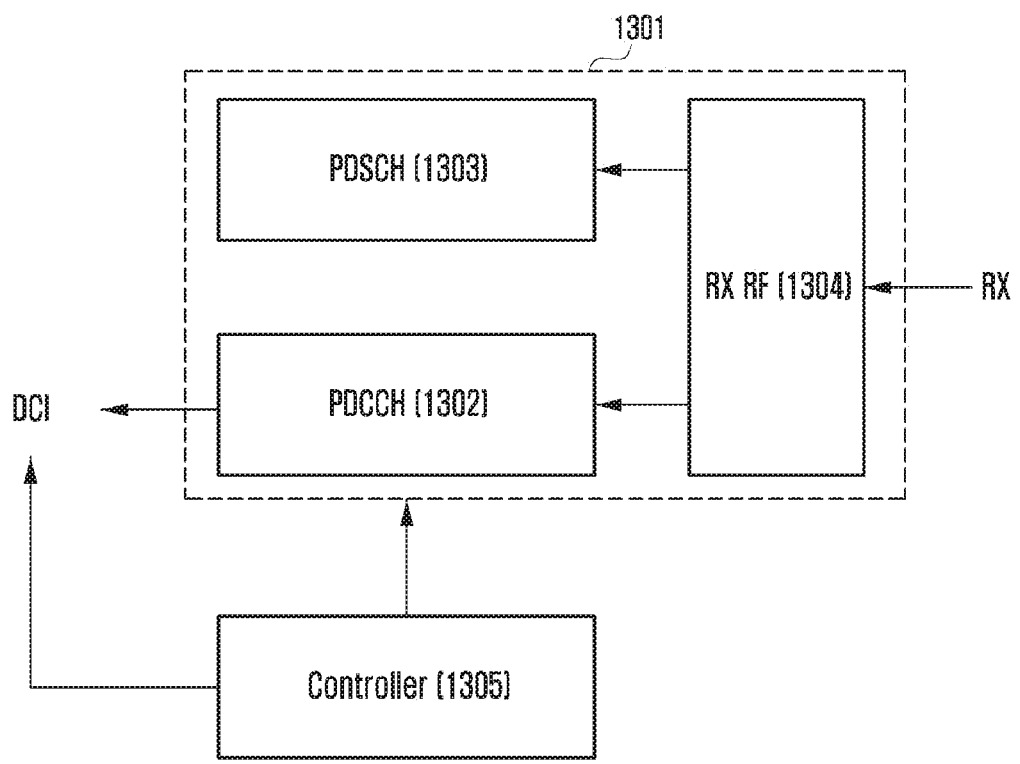
FIG. 13 is a diagram schematically illustrating a configuration of a terminal according to the present disclosure.

FIG. 13 schematically illustrates a configuration of a terminal according to the present disclosure. For convenience of explanation, illustration and description for a component that is not directly related to the present disclosure will be omitted.

Referring to FIG. 13, the terminal may include a transceiver 1301 and a controller 1305.

The transceiver 1301 according to an embodiment of the present disclosure may transmit and receive a signal to and from an external apparatus (e.g., terminal or other base station). The transceiver 1301 may include, for example, a PDCCH block 1302, a PDSCH block 1303, and a reception (RX) RF block 1304.

The controller 1305 according to the embodiment of the present disclosure may control each component block of the transceiver 1301 according to the detailed method of the above-described embodiment so that DCI transmitted by the base station may be received by the terminal.

The transceiver 1301 may process the received signal in the RX RF block 1304, separate PDCCH and PDSCH signals for the terminal from the received signal, and then acquire DCI and data transmitted by the base station through the PDCCH block 1302 and the PDSCH block 1303.

For example, the controller 1305 according to the embodiment of the present disclosure may perform a control to receive control information corresponding to the broadband transmission mode through a first bandwidth. Further, the controller 1305 may perform a control to receive downlink data having, as a maximum bandwidth, a bandwidth expanded as much as a second bandwidth from the first bandwidth, based on the control information.

The controller 1305 may perform a control so that a first cell having the first bandwidth is connected before receiving the control information. Further, the controller 1305 may perform a control to receive a configuration message including configuration information of the broadband transmission mode from the first cell.

The embodiments of the present disclosure disclosed in the present specification and the accompanying drawings have been provided only as specific examples in order to assist in understanding the present disclosure and do not limit the scope of the present disclosure. It is obvious to those skilled in the art that various modifications may be made without departing from the scope of the present disclosure. Further, the respective embodiments may be combined and operated as needed.

What is claimed:

1. A method for performing communication by a terminal in a wireless communication system, the method comprising:
    measuring a strength of at least one signal received from at least one neighboring cell;
    identifying a second cell having a strength of a received signal greater than a predetermined threshold;
    transmitting, to a first cell, a measurement report message including an identification (ID) of the second cell and the received signal strength;
    receiving, from the first cell, a radio resource control (RRC) reconfiguration message including broadband transmission mode information; and
    communicating with the first cell and the second cell, after transmitting a RRC reconfiguration complete message through the first cell,
    wherein the broadband transmission mode information includes at least one of downlink carrier bandwidth information of the second cell, physical downlink shared channel (PDSCH) mapping information of the second cell, and scrambling information for the PDSCH of the second cell, and
    wherein the PDSCH mapping information of the second cell indicates from which OFDM symbol the PDSCH of the second cell is mapped or whether a synchronization signal or a physical broadcast channel (PBCH) is transmitted by the second cell.

2. The method of claim 1, wherein the PDSCH of the second cell is mapped to resources for transmitting the PBCH and the synchronization signal, when the PBCH and the synchronization signal are not transmitted by the second cell during the communication.

3. The method of claim 1, wherein the scrambling information for the PDSCH of the second cell includes at least one of whether data scrambling in the second cell is performed independently of the first cell or whether data scrambling in the second cell is performed together with data in the first cell.

4. The method of claim 1, wherein the broadband transmission mode information further includes at least one of information of an antenna configuration of the second cell, information of a bandwidth and center frequency of an uplink component carrier of the second cell, information related to physical random access channel transmission of the second cell, information related to uplink power control of the second cell, information related to channel state information (CSI) transmission for the second cell, information related to sounding reference signal (SRS) transmission for the second cell, or information related to downlink and uplink data transmission of the second cell.

5. A method for performing communication by a base station in a wireless communication system, the method comprising:
    connecting a terminal to a first cell;
    receiving, from the terminal through the first cell, a measurement report message including an identification (ID) of a second cell and a strength of a received signal of the second cell;
    identifying whether to set a broadband transmission mode for the terminal based on the received measurement report message;
    transmitting, to the terminal through the first cell, a radio resource control (RRC) reconfiguration message including broadband transmission mode information based on the identification;
    receiving, from the terminal through the first cell, an RRC reconfiguration complete message; and
    communicating with the terminal using the first cell and the second cell,
    wherein the broadband transmission mode information includes at least one of downlink carrier bandwidth information of the second cell, physical downlink shared channel (PDSCH) mapping information of the second cell, and scrambling information for the PDSCH of the second cell, and
    wherein the PDSCH mapping information of the second cell indicates from which OFDM symbol the PDSCH of the second cell is mapped or whether a synchronization signal or a physical broadcast channel (PBCH) is transmitted by the second cell.

6. The method of claim 5, wherein the PDSCH of the second cell is mapped to resources for transmitting the PBCH and the synchronization signal, when the PBCH and the synchronization signal are not transmitted by the second cell during communication.

7. The method of claim 5, wherein the scrambling information for the PDSCH of the second cell includes at least one of whether data scrambling of in the second cell is performed independently of data in the first cell or whether data scrambling in the second cell is performed together with data in the first cell.

8. The method of claim 5, wherein the broadband transmission mode information further includes at least one of information of an antenna configuration of the second cell, information of a bandwidth and center frequency of an uplink component carrier of the second cell, information related to physical random access channel transmission of the second cell, information related to uplink power control of the second cell, information related to channel state information (CSI) transmission for the second cell, information related to sounding reference signal (SRS) transmission for the second cell, or information related to downlink and uplink data transmission of the second cell.

9. A terminal configured to perform communication in a wireless communication system, the terminal comprising:
  a transceiver configured to transmit and receive at least one signal; and
  a controller configured to connect to a first cell and to control:
    measuring a strength of signals received from at least one neighboring cell,
    identifying a second cell having a strength of a received signal greater than a predetermined threshold,
    transmitting, to a first cell, a measurement report message including an identification (ID) of the second cell and the received signal strength,
    receiving, from the first cell, a radio resource control (RRC) reconfiguration message including broadband transmission mode information, and
    communicating with the first cell and the second cell, after transmitting an RRC reconfiguration complete message through the first cell,
  wherein the broadband transmission mode information includes at least one of downlink carrier bandwidth information of the second cell, physical downlink shared channel (PDSCH) mapping information of the second cell, and scrambling information for the PDSCH of the second cell, and
  wherein the PDSCH mapping information of the second cell indicates from which OFDM symbol the PDSCH of the second cell is mapped or whether a synchronization signal or a physical broadcast channel (PBCH) is transmitted by the second cell.

10. The terminal of claim 9, wherein the PDSCH of the second cell is mapped to resources for transmitting the PBCH and the synchronization signal of the second cell, when the PBCH and the synchronization signal are not transmitted by the second cell during communication with the second cell.

11. The terminal of claim 9, wherein the scrambling information for the PDSCH of the second cell includes at least one of whether data scrambling in the second cell is performed independently of the first cell or whether data scrambling in the second cell is performed together with data the first cell.

12. The terminal of claim 9, wherein the broadband transmission mode information further includes at least one of information of an antenna configuration of the second cell, information of a bandwidth and center frequency of an uplink component carrier of the second cell, information related to physical random access channel transmission of the second cell, information related to uplink power control of the second cell, information related to channel state information (CSI) transmission for the second cell, information related to sounding reference signal (SRS) transmission for the second cell, and information related to downlink and uplink data transmission of the second cell.

13. A base station configured to perform communication in a wireless communication system, the base station comprising:
  a transceiver configured to transmit and receive at least one signal; and
  a controller configured to connect to a first cell and to control:
    connecting to a terminal by the first cell,
    receiving, from the terminal through the first cell, a measurement report message including an identification (ID) of a second cell and a strength of a received signal of the second cell,
    identifying whether to set a broadband transmission mode for the terminal based on the received measurement report message,
    transmitting, to the terminal through the first cell, a radio resource control (RRC) reconfiguration message including broadband transmission mode information based on the identification,
    receiving, from the terminal through the first cell, an RRC reconfiguration complete message, and
    communicating with the terminal using the first cell and the second cell,
  wherein the broadband transmission mode information includes at least one of downlink carrier bandwidth information of the second cell, physical downlink shared channel (PDSCH) mapping information of the second cell, and scrambling information for the PDSCH of the second cell, and
  wherein the PDSCH mapping information of the second cell indicates from which OFDM symbol the PDSCH of the second cell is mapped or whether a synchronization signal or a physical broadcast channel (PBCH) is transmitted by the second cell.

14. The base station of claim 13, wherein the PDSCH of the second cell is mapped to resources for transmitting the PBCH and the synchronization signal of the second cell, when the PBCH and the synchronization signal are not transmitted by the second cell during communication with the second cell.

15. The base station of claim 13, wherein the scrambling information for the PDSCH of the second cell includes at least one of whether data scrambling in the second cell is performed independently of the first cell or whether data scrambling in the second cell is performed together with data in the first cell.

16. The base station of claim 13, wherein the broadband transmission mode information further includes at least one of information of an antenna configuration of the second cell, information of a bandwidth and center frequency of an uplink component carrier of the second cell, information related to physical random access channel transmission of the second cell, information related to uplink power control of the second cell, information related to channel state information (CSI) transmission for the second cell, information related to sounding reference signal (SRS) transmission for the second cell, and information related to downlink and uplink data transmission of the second cell.

* * * * *